United States Patent [19]
Lee

[11] 3,926,754
[45] Dec. 16, 1975

[54] ELECTROCHEMICAL CONTAMINANT REMOVAL FROM AQUEOUS MEDIA

[75] Inventor: Sung Ki Lee, Amherst, N.Y.

[73] Assignee: Andco Incorporated, Buffalo, N.Y.

[22] Filed: Feb. 16, 1973

[21] Appl. No.: 332,884

Related U.S. Application Data

[63] Continuation-in-part of Ser. No. 225,417, Feb. 11, 1972, Pat. No. 3,776,037.

[52] U.S. Cl. .................. 204/152; 204/97; 204/130; 204/149
[51] Int. Cl. ........................... C02c 5/12; B01k 1/00
[58] Field of Search ............ 204/149, 152, 130, 97, 204/51

[56] References Cited
UNITED STATES PATENTS

| | | | |
|---|---|---|---|
| 937,210 | 10/1909 | Harris | 204/149 |
| 2,600,171 | 6/1952 | Sagen | 204/97 X |
| 2,982,608 | 5/1961 | Clement | 204/130 X |
| 3,347,786 | 10/1967 | Baer et al. | 204/149 X |
| 3,682,796 | 8/1972 | Dev Bedi et al. | 204/97 |
| 3,719,570 | 3/1973 | Lancy | 204/151 |

Primary Examiner—John H. Mack
Assistant Examiner—A. C. Prescott
Attorney, Agent, or Firm—Christel & Bean

[57] ABSTRACT

Contaminating ions are removed from an aqueous medium, e.g., hexavalent chromium ions from cooling tower waters, by an electrochemical method which includes formation of an insoluble iron compound or complex of the contaminant ion, utilizing an anode of iron, iron alloy or insoluble iron compound. The hexavalent chromium contaminant, as chromate or dichromate, is changed to trivalent chromium, a less toxic form. The method is applicable to the removal of other contaminant ions, e.g., cyanide, which also converts to less toxic form. Also described are electrolytic cells and apparatuses useful in effecting the method.

20 Claims, 7 Drawing Figures

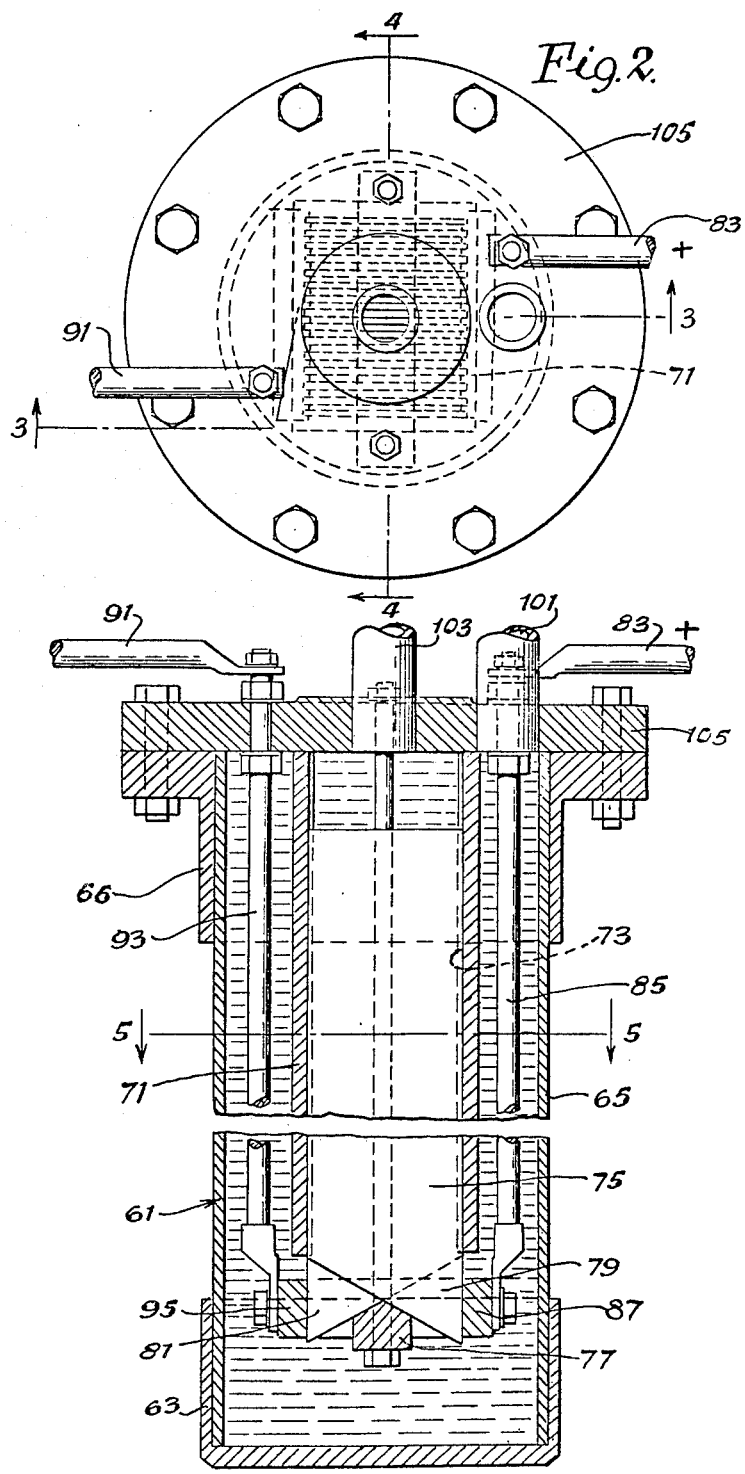

ELECTROCHEMICAL CONTAMINANT REMOVAL FROM AQUEOUS MEDIA

This is a continuation-in-part of my U.S. Pat. application Ser. No. 225,417 for Electrochemical Processes and Apparatuses for the Removal of Contaminants from Aqueous Media, filed Feb. 11, 1972, now U.S. Pat. No. 3,776,037 issued Oct. 16, 1973.

This invention relates to methods for the treatment of liquids to remove contaminants or pollutants from them. More particularly, the invention is for the electrochemical treatment of spent processing solutions, rinse waters, e.g., plating rinses, waste water streams and effluent or purge streams, as from cooling towers and the wet scrubbing of contaminated gases, and the like. The invention also relates to electrolytic cell structures utilizing iron, iron alloys or insoluble iron compounds for anodes thereof.

Prior art methods for the removal of wastes from liquid or aqueous media have included chemical reactions, drying and combustion, ion-exchange, sorption and electrolytic processes to convert the wastes to acceptable different compounds or to concentrate them and make them more readily disposable. The chemical processes often require the steps of acidification, to obtain low pH; chemical addition, to effect the reaction, such as reduction or oxidation; neutralization to precipitate out the reaction products; and separation of the solid precipitate from the liquid. Electrolytic means have been employed and iron and aluminum metals of electrodes have been converted to oxides or hydroxides, in the forms of flocculent precipitates which physically entrapped or sorbed insolubles from the aqueous medium. However, such electrodes had not been satisfactorily employed in electrochemical reactions with contaminants to make insoluble electrode metal salts or complexes of contaminants for removal from a liquid medium. Now, however, by following the method of this invention, with no pH adjustment of the influent or effluent and no chemical additions, one can effectively remove ionic as well as nonionic contaminants by converting them to insoluble compounds. The insoluble iron compounds or complexes of contaminant ions formed with the electrode metal are readily removable from the aqueous medium in which they were originally present, facilitating purification of the medium. Additionally, in preferred embodiments the method converts the original ion to a less toxic form by either oxidation or reduction, as in the case of changing chromate ion containing hexavalent chromium to chromium in trivalent form. Similarly, cyanide may be changed to ferrocyanide and ferrocyanate. Whereas it was previously considered necessary to have a very high acidity in a solution to form trivalent chromium from the hexavalent material according to the reaction:

$$Cr_2O_7^= + 14H^+ + 6e \longrightarrow 2Cr^{+3} + 7H_2O$$

in which

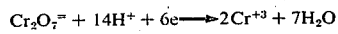

$$E = 0.902 + 0.01 \log \frac{Cr_2O_7^=}{(Cr^{+3})^2} - 0.14 \text{ pH}$$

(E being the Redox Potential), and whereas cyanide ion will be converted to HCN in highly acidic media, it is now found possible to run the reactions of this invention at pH's hitherto considered antagonistic or unfavorable.

In accordance with the present invention a method for electrochemically removing from an ionizing medium a contaminant ion which is capable of forming an insoluble iron compound, complex or co-precipitate comprises passing an electric current between an anode which has a surface or a portion of a surface thereof of iron, iron alloy or insoluble iron compound, and a cathode, through the ionizing medium containing the ion to be removed, so as to produce anodically an insoluble iron compound, species or complex while cathodically reacting with the contaminant ion, to form insoluble products, and removing such insoluble materials from the aqueous medium. In preferred embodiments of the invention the contaminant, which is initially toxic, is converted to non-toxic or less toxic form, which is insoluble, and is removed. For example, hexavalent chromium in chromate or dichromate salt form is changed to the less toxic trivalent form which is capable of forming insoluble complexes and is removed as a complex of iron, which may also be thought of as a mixture of chromic hydroxide and iron oxide or hydroxide. Also within the invention are apparatuses, such as electrolytic cells, which include anodes having on their surfaces at least portions of iron, iron alloy or insoluble iron compound and which are of structures to facilitate continuous flow through them of aqueous media to be detoxified, while avoiding blockages or covering of the anodes with insulating insoluble reaction products.

The present invention is applicable to the treatment of various liquids containing iron-precipitatable, co-precipitatable or complex-forming impurities or toxicants, such as those liquids resulting from cooling tower operations, chromate conversion coatings, metal finishing industries, paper mill effluents, sanitary and municipal sewage, etc. Brackish waters may also be treated by this method but primarily it is useful for removal of toxicants such as hexavalent chromium, cyanide and other such materials from waste streams so as to avoid contamination of the waters into which such discharges ultimately flow. As a byproduct of the process, the harmful constituents may often be recovered in useful form. Even if it is decided that it is uneconomic to utilize them as recovered, possibly because of the inclusion with them of various impurities, the solid forms are more readily disposed of than the dilute solutions of the toxicant initially present.

The present invention, in its most preferred forms, chemically changes a toxic contaminant of a liquid medium to a less toxic form, e.g., hexavalent chromium to insoluble trivalent chromium, preferably as the hydroxide, while producing an iron flocculent that aids in removing the less toxic product by forming a complex with it or otherwise physically or chemically combining with it to form a removable solid, gel or flocculent material by the following synergistic reactions:

1. $Cr(OH)_3$ is amphoteric and normally requires a specific pH range for complete precipitation but in the presence of the iron complex of $Cr(OH)_3$ shows less tendency to be so pH sensitive;
2. Complete precipitation is obtained over a much wider pH range; and
3. Complete precipitation is obtained in a shorter residence time.

Such reactions can be effected utilizing dilute solutions of the contaminant to be treated and at reasonable pH's, near neutral. Prior art methods did not combine the use of iron, iron alloy or insoluble iron compound anodes with the reduction or other insolubilization reaction of the present invention and consequently, were unsuccessful. For example, although Belgian Pat. No. 739,684 oxidizes or reduces toxic ions in a semi-conductive bed of solid particles, additional chemical adjustments are required to maintain the proper pH for the reaction and the solid particles have to be regenerated frequently. Carbon or graphite electrodes have been employed to oxidize cyanide and to reduce hexavalent chromium but very low pH's are required to maintain useful reaction rates. On the contrary, with the present invention pH adjustment is essentially self-controlled and may be in a near neutral range, e.g., 4 to 11, preferably 6 to 11. In reactions in such ranges effluents containing even very small quantities of contaminants can be detoxified by treating them electrochemically in the present iron anode cells, making insoluble iron oxide, hydroxide or other iron derivative, which forms a flocculent to remove suspended solid material, and at the same time causing hexavalent chromium to undergo a rapid and complete reduction to trivalent chromium, which forms chromic hydroxide and separates out from the medium. A complex of the iron flocculent and chromic hydroxide forms and the combination is removable from the medium and entraps and sorbs other impurities present, both insoluble and soluble. Unlike most reactions wherein iron hydroxide is produced, in the present one no objectionable rust color results. Also, the combination in the complex of both iron and chromium flocculents and/or precipitates makes easier the separation of such solid materials from the treated stream. In a similar manner cyanide ion in the stream is convertible to ferric ferrocyanide or other suitable derivative. When either or both of cyanide and hexavalent chromate and/or dichromate are present in the aqueous medium to be treated the ferric ferrocyanide or other cyanide derivative and the complex of trivalent chromic hydroxide and iron hydroxide are readily removable by settling or filtration, centrifuging and other separation techniques.

The reaction does not require the presence of a diaphragm or other separator between the anode and cathode portions of the electrolytic cell, and because of the pH selfcontrolling feature of the invention, in many cases it does not require conductivity or pH adjustments. Surprisingly, the hexavalent chromium undergoes cathodic reduction to form trivalent chromium, insoluble chromic hydroxide and the mentioned complexes and these are not susceptible to further electrolytic oxidation at the anode back to hexavalent chromium, apparently due to the difference in ionization potential, at least in part because the production of the hydroxide from the iron at the anode occurs at a much lower potential than other electro-oxidations. Thus, because of the non-amphoteric state of the iron complex, the reaction continues until the undesirable contaminating ion is completely or substantially completely removed from the aqueous medium as a solid. Similarly, the reaction will be driven to completion when the product is a gas.

Although the invention is directed primarily to the removal of hexavalent chromate contaminant from waste or process streams, it is also useful to remove phosphate, cyanide, cyanate, arsenate, pyroarsenate, antimonate, selenate and other such materials wherein the soluble form, upon reduction, produces either an insoluble solid, preferably complex-forming with iron hydroxides or oxides, or a gas. Of course, in cases where the gas is also poisonous, provision will also be made for recovering it or chemically converting it to non-toxic or disposable form.

The various methods, apparatuses, operations, constructions, conditions, details, uses and advantages of the invention will be apparent from the following description, taken in conjunction with the illustrative drawing of preferred embodiments of the apparatuses used to practice the method, in which drawing:

FIG. 2 is a top plan view of an electrochemical cell of the present invention for use in removal of contaminants from aqueous solutions;

FIG. 3 is a central vertical sectional view along plane 3—3 of FIG. 2;

Figure 1:
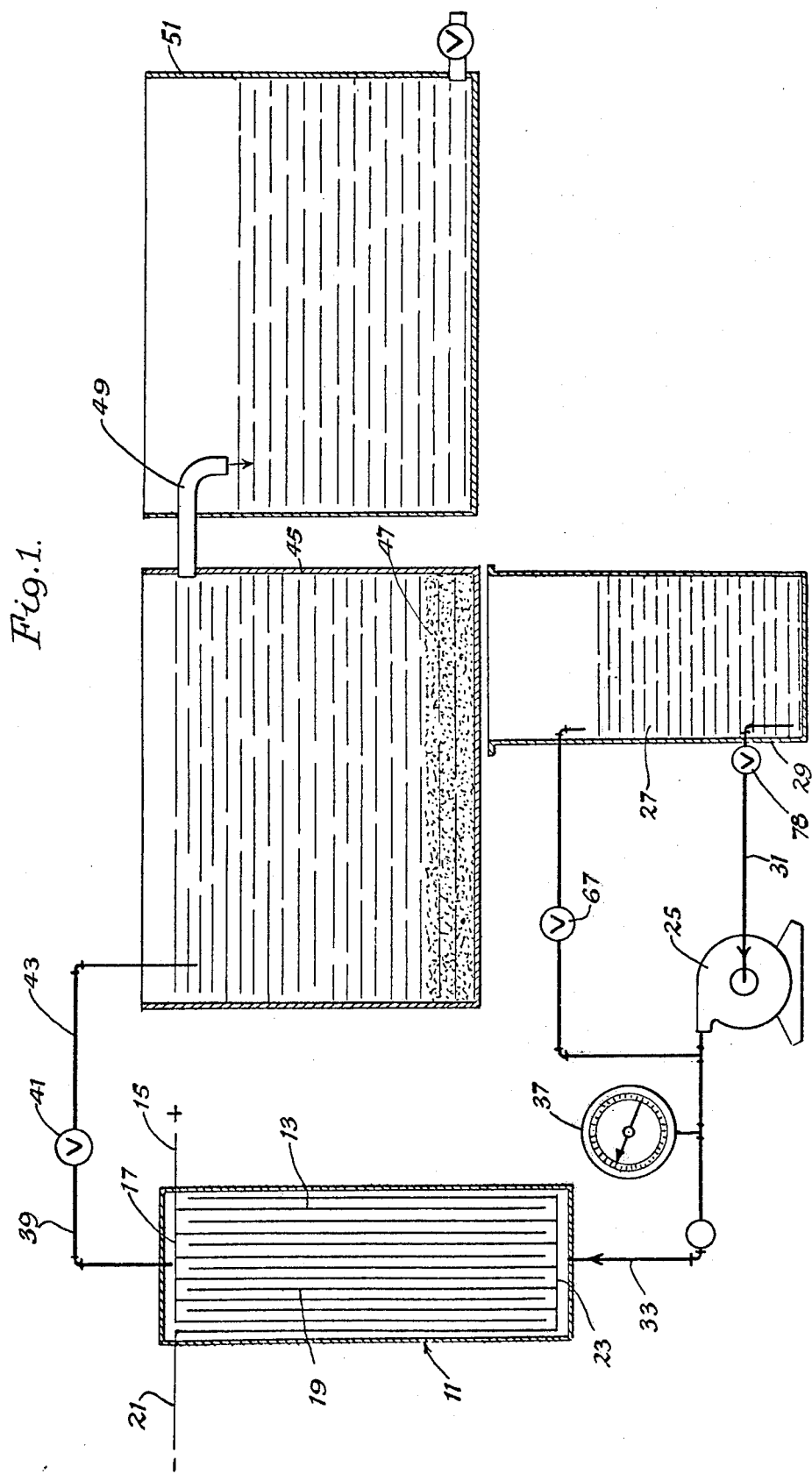
FIG. 1 is a schematic diagram of an apparatus for removing contaminants from liquids by the method of this invention.
Figure 4:
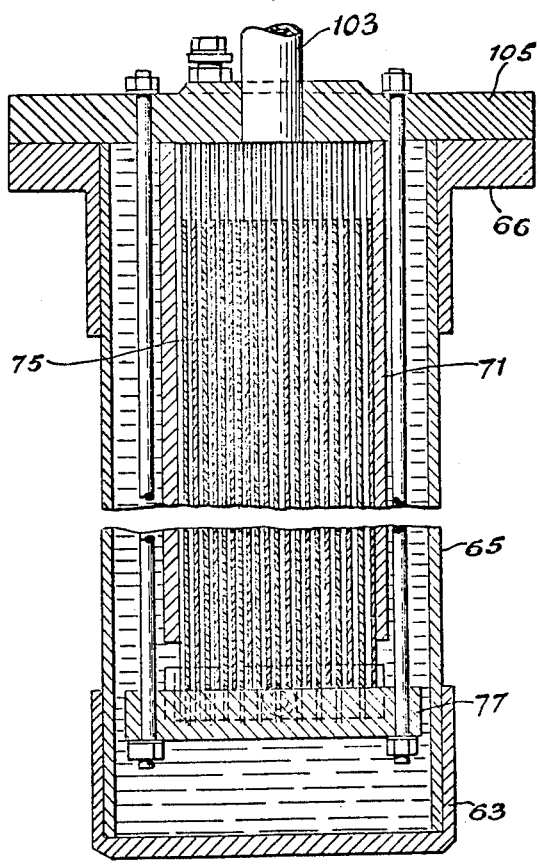
FIG. 4 is a central vertical sectional view along plane 4—4 of FIG. 2.
Figure 5:
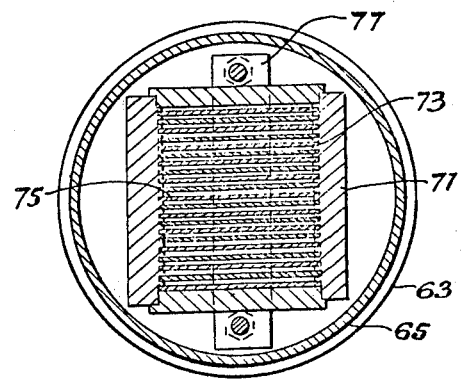
FIG. 5 is a horizontal sectional view along plane 5—5 of FIG. 3.
Figure 6:
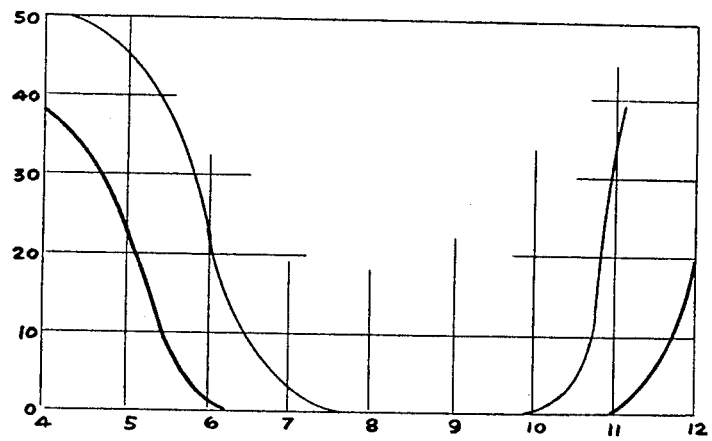
FIG. 6 is a plot of trivalent chromium ion solubility in water vs. pH.
Figure 7:
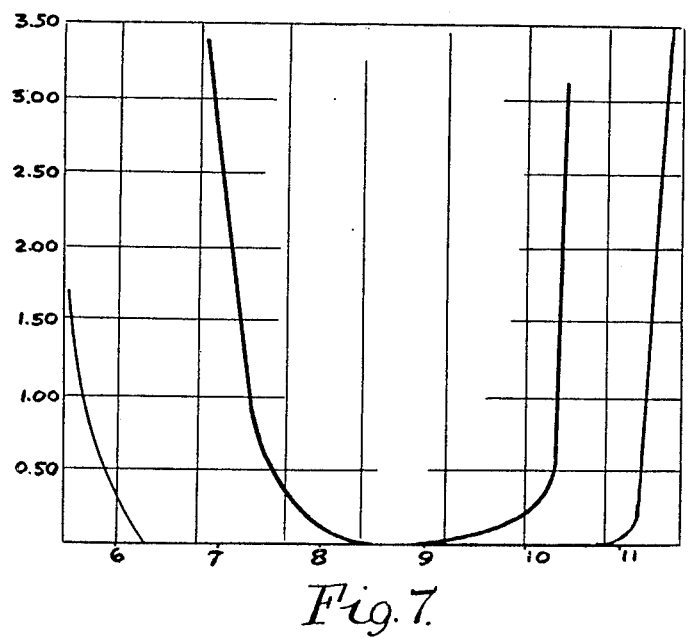
FIG. 7 is an enlarged portion of the plot of FIG. 6.

In FIG. 1, electrolytic cell 11 includes anodes 13 of iron, iron alloy, e.g., steel, stainless steel or insoluble iron compound, e.g., ferrous oxide, magnetite, connected to a source 15 of direct electric current through an anode bus 17, and cathodes 19, connected to a negative sink 21 through cathode bus 23. In the cell illustrated the anodes and cathodes are monopolar and a plurality of them is shown. However, different numbers of anode-cathode combinations may be employed, both greater and less, and bipolar, as well as unipolar arrangements can be used.

Pump 25 draws an aqueous liquid medium or solution 27 from tank 29 or other source through inlet line 31, and discharges it through line 33 to electrolytic cell 11. Flow meter 37 measures the flow of the solution containing contaminant to be removed so that the flow may be controlled by adjusting pump speed, valve 78 or proportion through valve 67. The solution, now containing insoluble derivative of the contaminant, e.g., ferric hydroxidechromic hydroxide complex, in flocculent precipitate form, flows out of the cell through line 39 past valve 41, through line 43 into settling tank 45, where coagulant is added to coagulate the flocculents. The coagulum 47 is removed from the flowing solution stream by sedimentation. Next, the clarified solution passes through line 49 into storage tank 51 or other reservoir, or in some cases, through a disposal line connecting to a sewer, a recycle line or other suitable stream. Instead of utilizing a settling tank, in some instances it may be desirable to employ continuous filter means for removing the insoluble precipitate from the treated liquid.

In FIG'S. 2-5 electrolytic cell 61 includes a cup-shaped base 63, a cylindrical central section 65 and a flanged upper portion 66, all joined together in liquid-tight relationship to serve as a container for electrolyte and the positioned electrodes. The container is principally made of polyvinyl chloride or chlorinated polyvinyl chloride but other plastics and inert materials of construction may also be utilized. Inside the cylindrical body is positioned a holder 71, grooved at a plurality of locations 73 to support the electrodes 75. The electrode holder 71 has an open bottom with a support 77 extending across it and supporting the angled electrodes, anodes 79 and cathodes 81. Electricity is carried to the anodes 79 by lead 83, connector 85 and strap or bus 87 while the connection to cathodes 81 is by means of lead 91, connector 93 and bus 95. Inlet 101 carries liquid into the cell and outlet 103 is for the effluent, including suspended insoluble material. Top flange 105 is joined to the cell body and serves to hold various other cell parts in position.

As illustrated, the electrolytic cell is of the monopolar type, with alternating electrodes of different sign. However, this may be modified to a bipolar arrangement, in known manner.

The curves of FIG'S. 6 and 7 show pH ranges wherein trivalent chromium is insoluble. The "inner" curves of both figures represent trivalent chromium solubility in the absence of other materials, such as iron. The outer curves show the extensions of the pH range in which trivalent chromium may be precipitated when iron is present. Thus, ferric hydroxide-chromic hydroxide mixtures and complexes are producible to remove chromium in trivalent form over a wider pH range from a contaminated liquid medium which originally contained hexavalent chromium.

The contaminant to be insolubilized by the present reaction may be in various liquid media in which ionic reactions may occur but in almost all cases the medium will be aqueous and usually it will be primarily, over 50% water. Generally, the contaminant will be substantially completely or entirely dissolved in the medium. The water content of the medium will normally be over 90%, usually over 95% and often over 99%. However, various non-interfering solvents, solutes and suspended materials may also be present. For example, an aqueous alcoholic medium may be utilized and additional dissolved solids such as are present in brackish waters, sea waters, chromate conversion coating rinses, metal finishing treatment rinses, metal plating rinses, cooling tower purge waters, foundry wastes and agricultural run-offs are treatable by the present method, along with the particular mentioned contaminants to be removed from them.

In addition to removing the toxic contaminants previously mentioned, the present processes and apparatuses are capable of treating other materials which may accompany those mentioned. Included in this group are ferrocyanides, borates, tungstates, phosphites, sulfates, sulfites, persulfates, carbonates, silicates and phosphates and various forms of such materials of higher and lower acidities and higher and lower oxidation levels, e.g., perborates, bisulfates, sesquisilicates, etc. If the iron oxide or hydroxide complex of such material or an iron salt of it is less soluble than the concentration of the material in the medium to be treated, it will usually be removable by the process. Even in some cases where such materials are quite soluble, they tend to be sorbed by the flocculent reaction products and their concentrations are diminished.

The various contaminants are normally present in or were added to the medium being treated as soluble salts or as acids. Generally, when they are present as salts the salts will be ammonium or alkali metal salts such as sodium and potassium salts but because the reactions are essentially ionic the particular salt-forming cations are not of highest importance. Mixtures of such salt-forming materials may be present and of course, mixtures of the contaminants may be treated.

The anodes will have the active surfaces thereof at least partially of a material which releases iron in the aqueous medium due to the action of the electric current. It is not essential that the iron donating compound or material should cover the entire surface of the anode but usually it will be at least 50% and preferably over 90% thereof and in most preferred cases the entire electrode will be of such material. Mixtures of iron, iron alloys and insoluble iron compounds may be employed. The cathodes are preferably also of iron, to facilitate their use as anodes when it is desirable to reverse current flow for cleaning purposes, to increase cell life, etc., but they may also be of other suitable electrode materials previously mentioned. Because the cathode is relatively inert with respect to removal of the contaminant ions from the aqueous medium being treated the nature of the cathode material is not critical but it should be compatible with the anode and the electrolyte and of course, should not interfere with the insolubilization of the soluble contaminant to be removed.

The electrolytic cell employed may be of any structure in which the electrodes are located in any suitable configuration and the electrodes may be either monopolar or bipolar. However, vertical stacks of monopolar iron electrodes in which each electrode is monolithic are preferred. Equivalent forms, such as screens, perforated curved sheets, mixtures of screens and perforated sheets, solid sheets, bars and shot may be used to promote the best flows. Also, electrodes of the different materials already mentioned may be employed and the anodes and cathodes may be the same or different. In some instances, it may be desired to utilize different materials for individual anodes or a plurality of such materials may be employed in an anode or cathode. The assembled electrolytic cell, with electrodes, frame, conductors, piping and seals in place, is usually sized to fit the particular application contemplated and sizes, clearances and designs may be varied, as is suitable.

The method of this invention may be applied to various concentrations of the anionic contaminant in ionizing medium. Generally, the proportion of such contaminant will be less than 1% in the medium although as much as 15% may sometimes be present. Normally, because of the limiting effects of the solubilities of the complexes and other insoluble derivatives of the contaminants the initial contaminant concentration will be no less than 0.03 parts per million. In most instances it will be from 1 to 5,000 p.p.m. and usually is from 2 to 500 p.p.m. The current density range, in amperes per square foot (ASF) will be within the 0.05 to 500 range, preferably 1 to 10 and more preferably 2 to 3 for both bipolar and unipolar arrangements. The voltage is usually from 0.1 to 50 volts, preferably 0.5 to 20 volts and most preferably from 5 to 15 volts in unipolar arrangement. The current is in the range of 0.5 to 20,000 amperes, preferably from 2 to 1,000 amperes per cell module and most preferably from 50 to 500 amperes for unipolar. For bipolar cells the voltage range is 500 to 5,000 when the current is from 0.5 to 50 amperes. For unipolar configurations current will be high and voltage low whereas for bipolar cells the reverse will usually be true.

The pH is maintained within the range of about 4 to 11, more preferably from 6 to 10. It is recognized that it should be such that the insoluble derivative or complex of the contaminant form will have a solubility sufficiently low so that the treatment decreases its concentration in the aqueous medium and such decrease is usually to less than half the quantity initially present. Normally the concentration will be lowered to less than 5 p.p.m. and preferably to less than 1 p.p.m. with decreases to less than 0.1 p.p.m., 0.01 p.p.m. and even to 0.00 p.p.m. not being uncommon. Of course, the pH, as well as the electrical conditions, can usually be adjusted or controlled to produce the most desirable removal of contaminant and such adjustments will depend on the nature of the contaminants. The temperature of the contaminated solutions to be treated will normally be within the 10° to 50°C. range, preferably about 15° to 30°C., and often will initially be ambient and will be raised by the electrolytic reaction about 2° to 20°C. above ambient.

Dwell times in the various apparatuses for the contaminated medium to be treated may vary widely, being as little as 0.001 minute to as long as an hour but normally at least five seconds or 0.1 minute is required. The dwell time is determined by the flow of electricity, with six coulombs being the theoretical amount and being found to be about the charge required to convert one milligram of hexavalent chromium to trivalent chromium. When utilizing single pass continuous processes and electrolytic cells it is found that an excess of from 50 to 200% of electricity may often be required, generally being about 100%. After the insoluble contaminant compound or complex of iron has been made it may be filtered out or settled out from the effluent liquid from the cell by conventional means.

To help speed the separation of the insoluble complex from the liquid and to help remove other insoluble materials, after removal of the treated liquid from the electrochemical cell it may be further treated with a suitable polyelectrolyte or coagulant. Among the most useful of such materials are the polyfunctional polyelectrolytes and of these the most preferred are the water soluble polymers of my U.S. Pat. application Ser. No. 304,221, filed Nov. 6, 1972, entitled Water Soluble Polyfunctionalized Polymers of Alpha, Beta-Unsaturated Active Hydrogen-Containing Monomers, the disclosure of which application is included herein by reference.

The polyelectrolyte or other coagulant or flocculent treatment is preferably effected before any separation of flocculent or other insolubles from the effluent from the treatment cell or afterward. Such treatments may be repeated but usually only one is enough. The treated and separated effluent may be recycled to another or the same electrochemical cell for retreatment or may be cascaded to other such cells for subsequent treatments. In each case, polyelectrolyte or equivalent treatment may be employed to assist in removing the insolubles but usually it will be effected only after the final treatment or after the initial and final treatments.

The following examples serve to illustrate the invention but do not limit it. All parts are by weight and all temperatures are in °C. unless otherwise mentioned. The examples given are mostly with respect to the removal of low concentrations of hexavalent chromium in the form of chromate ion from waste waters because this is an important and difficult problem which has been solved by the present invention. Nevertheless, it is evident that many other impurities are also removable by the same or slightly modified methods.

EXAMPLE 1

To an apparatus of the type illustrated in FIG'S. 2–3, having a volume of twenty gallons, equipped with multiplate iron anodes and cathodes and spacers of polyvinyl chloride, 0.03 inch thick, there is fed an aqueous solution containing chromate ion corresponding to 150 p.p.m. of hexavalent chromium. The flow of such solution is maintained at a rate of five gallons per minute. The pH of the incoming solution is 6.5 and the reaction is carried out without making any adjustments of pH by addition of acid, base or buffer, other than by the production of hydroxyl ions at the cathode. A DC voltage of ten volts is applied and the current flow is 50 amperes. The current density is 2 to 10 ASF and is preferably held at 2.5 ASF. The electrochemical reaction for the operation of this example takes 6 to 12 coulombs to reduce 1 mg. of hexavalent chromium to trivalent chromium. For oxidations or reductions of other materials proportional quantities of electricity are used, according to Faraday's Law. The reaction is monitored by periodic withdrawals of samples of the aqueous medium and by analyses using standard photoelectric means, as well as iodometric techniques.

The treated medium is removed and to it are added about 3.5 p.p.m. of polyfunctional polyelectrolyte of the type described in Example 1 of my U.S. Pat. application Ser. No. 304,221, obtained by the reaction of 77.7 parts of acrylamide monomer, 29 parts of maleic anhydride, 5 parts of 37% aqueous formaldehyde, 0.1 part potassium persulfate and 400 parts of aluminum sulfate octadecahydrate. The polymer has a viscosity of about 9,000 centipoises at 25°C.

After mixing of the polyfunctional polyelectrolyte the liquid is allowed to settle for two minutes, after which time a clear effluent is obtainable. Upon analysis it is found that the chromate content has been reduced to 0.001 p.p.m. Because of the excellent reduction in chromate content the liquid medium is not cascaded to other cells nor is it recycled. Instead, it is directly dischargeable into waste streams. When the experiment is repeated, using as the contaminant liquid a rinse obtained from the chromium plating of metals, similar excellent results are obtained. The following is a comparison of initial and final concentrations of components of such a rinse.

|  | Initial Concentration | Final Concentration |
| --- | --- | --- |
|  | (p.p.m.) | (p.p.m.) |
| Chromium (total) | 205 | 0.001 |
| $Cr^{+6}$ | 200 | 0.001 |
| $Al^{+3}$ | 30 | 0.00 |
| Nickel | 0.7 | 0.00 |
| Iron | 0.4 | 0.00 |
| $SO_4^=$ | 120 | — |
| $Fe(CN)_6^= + Fe(CN)_4^=$ | 80 | 20 |
| $SiF_4 + SiF_6$ | 80 | 20 |
| $NO_3^-$ | 80 | — |

-continued

|  | Initial Concentration | Final Concentration |
|---|---|---|
| pH | 6.5 | 9.0 |

In another run, using a charge of rinse water effluent from a phosphate metal treatment process, a 100 p.p.m. concentration of chromate is reduced to 0.01 p.p.m., under the same conditions.

From the results of the experiments it is apparent that the method is economically sound, and technically correct. The good rates of reaction and extents of chromate removal are shown to be obtained even at very low concentrations, apparently because they depend primarily on the electrical energy applied, within the 6 to 12 coulomb/mg. of hexavalent chromium range.

When, instead of using the chromate rinses from metal plating solutions, similar rinses from conversion coatings or related metal treatments are employed or when purges from cooling tower waters are treated, corresponding results are obtained as long as the above number of coulombs is applied. This is also the case over the ranges of pH, currents, voltages, current densities and other factors mentioned previously in the specification for chromate removal.

The use of my polyelectrolyte or coagulant additionally aids in separating out the insoluble complex and/or other products by the described reactions but good reductions in the quantities of toxic ions present in the solution to be treated are also obtainable without the use of the polyelectrolyte or similar material. The polyelectrolyte, at 3 p.p.m., when used after the electrochemical reaction of this invention to treat plater's waste containing $CrO_4^=$ and $CN^-$ in usual concentrations, is especially effective in reducing such ions to less than 1 or often, 0.1 p.p.m.

EXAMPLE 2

Following the method of Example 1, the effluent from a chromate conversion coating system, used to conversion coat aluminum parts of automobile heat exchangers in a commercial manufacturing plant, is passed through the electrochemical cell and is subsequently treated with polyelectrolyte. The current density utilized is controlled to be between 2.0 and 2.5 ASF and the electrical energy requirements are set to apply about 6 to 12 coulombs/mg. of hexavalent chromium.

The following results are obtained.

|  | Initial Concentration (p.p.m.) | Final Concentration (p.p.m.) | E.P.A. * Standard (p.p.m.) |
|---|---|---|---|
| Hexavalent chromium | 70 | 0.02 | 0.1 |
| Suspended solids | 80 | 1.2 | 20 |
| Fluorine | 20 | 5.0 | 15 |
| Copper | 6 | 0.1 | 1 |
| Iron | 5 | 0.01 | 1 |
| Aluminum | 60 | 0.01 | 1 |
| Zinc | 50 | 0.1 | 5 |
| Turbidity | 80 | 1.6 | 2.0 |
| pH | 5.8 | 8.6 | 8.5 |

* Environmental Protection Administration

EXAMPLE 3

In a twenty gallon volume cell like that of Example 1, and also using the apparatus of FIG. 1, 15 gallons of a chromium plating rinse having a hexavalent chromium content of 50 p.p.m. and of an initial pH of 6.2 are treated at room temperature and at atmospheric pressure. Over the twenty pairs of anodes and cathodes there is applied a voltage of about four volts, corresponding to a current density of 3.5 ASF over the total 1.7 sq. ft. area of each electrode. The application of the mentioned voltage is continued for ten minutes, during which time the electrolyte is circulated through the cell by the pump. At the completion of the operation the pH has risen to 9.5, the product, of a dark brown color, is removed and the hexavalent chromium content is reduced to 0.000 p.p.m. The precipitate is coagulated and filtered off in the same manner as described for Example 1.

EXAMPLE 4

At a throughput rate of about ten gallons per minute, a cooling tower water purge containing 20 p.p.m. chromate, 96 p.p.m. sulfate, 65 p.p.m. zinc ion, 95 p.p.m. phosphate, 150 p.p.m. chloride, 40 p.p.m. calcium ion and about 100 p.p.m. of suspended material is subjected to the electrolytic chemical treatments described in Example 2. The solution has an initial pH of 6.8 and after electrolysis at 6 amperes it is clarified and is found to contain no chromate, no zinc and no calcium ions and greatly diminished quantities of the anions, less than 20% of the proportions originally present. At the end of the reaction the solution pH is 8.5. With the solution 50 p.p.m. of the polyelectrolyte of Example 1 are admixed at room temperature to coagulate out the solid produced and those solids originally present. The polyelectrolyte addition results in the pH being reduced to about 7.

EXAMPLE 5

A foundry effluent containing 2% of colloidal clay, 30 p.p.m. of hexavalent chromium, 10 p.p.m. of $CN^-$, 500 p.p.m. of $Ca^{++}$, 300 p.p.m. of $Fe^{+++}$, 10 p.p.m. of phenol, 5 p.p.m. of $Cu^{++}$ and 3 p.p.m. $Ni^{++}$ and having a pH of 7.8, is treated by the method described in Example 4. Electrolytic treatment is effected without prior filtration. After five minutes of treatment, with the solution being treated flowing through the cell, the colloidal suspension is clarified and insoluble metal complexes and apparently coagulated colloidal material are separated out from the aqueous medium. Analysis of the clear effluent shows that it contains 0 p.p.m. chromate, 0 p.p.m. of the mentioned metal ions and significantly reduced (to less than 20% of the original quantities) amounts of other listed components of the original solution being treated.

EXAMPLE 6

The following tables describe the decrease in chromate concentration as treatments of rinses from chrome plating operations are continued. It is noted that the time for reduction to 0 p.p.m. chromate concentration is about the same in the experiments reported in Tables 1 and 2 although the concentration of the chromate in the material, the treatment of which is described in Table 2, is substantially greater initially.

rangements are also useful for periodic clean-outs and maintenance of the cells.

TABLE 1

| Time After Start (minutes) | pH | Potential (volts) | Current (amperes) | Chromate Conc. (p.p.m.) | kw.-hrs.* |
|---|---|---|---|---|---|
| 0 | 7.1 | 6.0 | 7.0 | 48.7 | 0 |
| 1 | 9.1 | 5.0 | 6.0 | 9.2 | 0.15 |
| 2 | 9.1 | 5.0 | 6.0 | 2.1 | 0.30 |
| 3 | 9.1 | 5.0 | 6.0 | 0.1 | 0.45 |
| 4 | 9.2 | 5.0 | 6.0 | 0 | 0.60 |

*kilowatt hours

TABLE 2

| Time After Start (minutes) | pH | Potential (volts) | Current (amperes) | Chromate Conc. (p.p.m.) | kw.-hrs. |
|---|---|---|---|---|---|
| 0 | 5.2 | 7.0 | 7.0 | 86.0 | 0 |
| 1 | 7.5 | 7.0 | 7.0 | 50.2 | 0.25 |
| 2 | 9.1 | 7.0 | 7.0 | 2.5 | 0.50 |
| 3 | 9.1 | 7.0 | 7.0 | 0 | 0.75 |

TABLE 3

CELL PARAMETERS

| Exp't. | Material | Anode Number of Plates | Total Surface Area (sq. in.) | Material | Number of Plates | Cathode Total Surface Area (sq. in.) | Electrode Spacing (in.) | Total Volume (gal.) |
|---|---|---|---|---|---|---|---|---|
| A | Iron | 1 | 128 | Fe | 1 | 128 | 0.25 | 20.8 |
| B | Iron * | 8 | 198 | Fe | 7 | 173 | 0.03 | 15.0 |
| C | Steel | 8 | 198 | Fe | 7 | 173 | 0.03 | 9.5 |
| D | " | 8 | 198 | SS ** | 7 | 173 | 0.03 | 2.8 |
| E | " | 16 | 396 | Fe | 14 | 347 | 0.03 | 2.8 |
| F | " | 36 | 891 | SS ** | 30 | 743 | 0.03 | 10 |
| G | " | 36 | 891 | SS ** | 30 | 743 | 0.03 | 10.5 |
| H | " | 36 | 891 | SS ** | 30 | 743 | 0.03 | 14.8 |
| I | " | 36 | 891 | SS ** | 30 | 743 | 0.03 | 14.8 |
| J | " | 36 | 891 | SS ** | 30 | 743 | 0.03 | 14.8 |
| K | " | 15 | 891 | SS ** | 15 | 743 | 0.03 | 14.8 |

OPERATING CONDITIONS / RESULTS

| Pumping Rate (gals./min.) | Reaction time (minutes) | Volts | Amperes | Initial pH | Initial Chromate (p.p.m.) | Final pH | Final Chromate (p.p.m.) |
|---|---|---|---|---|---|---|---|
| 0.5 | 10.0 | 2 | 6 | 5.8 | 200 | 7.5 | 0.02 |
| 5.0 | 5.5 | 5 | 16 | 6.5 | 62.3 | 8.5 | 0 |
| 3 | 1.6 | 5 | 16 | 7.0 | 56.8 | 9.0 | 0 |
| 0.5 | 2.9 | 5 | 16 | 7.5 | 54.8 | 8.5 | 0.2 |
| 0.5 | 7.8 | 5 | 6 | 8.0 | 69.7 | 9.9 | 0 |
| 3 | 5.1 | 10 | 50 | 8.0 | 88.4 | 9.9 | 0.01 |
| 3.2 | 3.5 | 10 | 50 | 7.3 | 88.2 | 9.3 | 0 |
| 4.5 | 3.5 | 10 | 50 | 6.5 | 63.8 | 8.2 | 0 |
| 4.5 | 2.2 | 10 | 50 | 7.2 | 55.7 | 9.1 | 0 |
| 4.5 | 4.2 | 10 | 50 | 9.0 | 15.7 | 9.5 | 0.05 |
| 4.5 | 1.3 | 10 | 50 | 9.5 | 60.0 | 9.5 | 0 |

* with iron oxide over 50% of surface
** stainless steel

EXAMPLE 7

Table 3 describes additional experiments run utilizing an electrolytic cell of the type shown in FIGS. 2–5. As is noted, the chromate concentrations are reduced to less than one p.p.m. from concentrations as great as 300 p.p.m. The reaction takes place in all cases in a single pass of room temperature liquid through the cell. For higher concentrations a multi-pass, recycle or cascade arrangement of cells is used and found to be additionally successful. Tandem ar-

EXAMPLE 8

In a continuous process, utilizing the electrochemical cell of FIG'S. 2–5, sixty different samples of chromate-containing aqueous solutions are treated to remove the chromate. The electrodes are hot rolled iron and the current passed through them is 50 amperes at 5 volts, with the current density being about 2.5 ASF and the flow rate of the aqueous medium treated being about five gallons per minute. Results of the experiments are summarized in Table 4, following.

TABLE 4

| No. of Samples | Initial $CrO_4^=$ (p.p.m.) | Final $Cr^{+6}$ (p.p.m.) | Initial pH | Final pH | Volume of Liquid Treated (gallons) | Total $Cr^{+6}$ Treated (grams) | Electricity Consumed (coulombs) |
|---|---|---|---|---|---|---|---|
| 18 | 30 to 33 | 0 | 6.9 | 8.3 | 875 | 44 | 525,000 |
| 26 | 30 to 33 | 0 | 6.9 | 8.3 | 2025 | 96 | 1,215,000 |
| 8 | 30 to 33 | 0 | 6.9 | 8.3 | 750 | 38 | 450,000 |

TABLE 4-continued

| No. of Samples | Initial CrO$_4$= (p.p.m.) | Final Cr$^{+6}$ (p.p.m.) | Initial pH | Final pH | Volume of Liquid Treated (gallons) | Total Cr$^{+6}$ Treated (grams) | Electricity Consumed (coulombs) |
|---|---|---|---|---|---|---|---|
| 8 | 29 to 32 | 0 | 6.9 | 8.3 | 600 | 26 | 360,000 |

During continuous operations, such as those of this example, it is preferable that both anode and cathode be made of the same material, such as hot rolled iron or steel, so that periodic current reversals may be effected, causing equal consumptions of both electrodes, thereby prolonging the useful life of the electrochemical cell. Normally, the direction of the flow of the current is reversed every eight hours.

EXAMPLE 9

The apparatus of FIG'S. 2–5 is modified so that the monopolar electrodes are alternately iron and lead, like those described in my parent patent application Ser. No. 225,417. Setting the electric current flow so that the lead electrodes are anodes, the hexavalent chromium of an aqueous solution containing about 30 parts per million chromate ion is converted to lead chromate, according to the method of Ser. No. 225,417, after which the current direction is reversed, making the iron electrode the anode. The iron hydroxide, chromic hydroxide (from hexavalent chromium not reduced or trivalent chromium not previously converted to the hydroxide, now insolubilized to chromic hydroxide) and the complex or mixture of the hydroxides and/or oxides, insoluble in the aqueous medium at the pH developed, about 8.5, are removed by settling and/or centrifuging. Also removed with the flocculent precipitate is the small amount of lead which was previously soluble in the system. By following this method, the addition of phosphate to the water being discharged is avoided (phosphate is employed in the method of Ser. No. 225,417 to remove any lead in excess of that required to combine with the hexavalent chromium to form lead chromate).

In the foregoing experiments the reactions can be speeded by application of additional electricity above the theoretical amount, especially in continuous single-pass cells. A broad range is from 100 to 500% of the theoretical charge, although 150 to 300% is more usual, and 200% is most preferred for the continuous processes.

EXAMPLE 10

Effluents from two different sources, one containing hexavalent chromium and the other containing cyanide are blended together in about 1:1 proportion of the mentioned contaminants and are then treated by passing the mix through the treating cell of Example 1 in the manner therein described. In the ratio of mixing employed the pH of the mixture is about 5, although pH's in the range of 4 to 7 or 8 are also often acceptable. At the completion of treatment the pH has risen to about 7 but final pH's in the range of 6.5 to 9 are also acceptable and often result in excellent decontaminations of treated solutions. The initial and final concentrations of various components of the solution are given below.

| Ions Present | Initial p.p.m. | Final p.p.m. |
|---|---|---|
| CrO$_3$ + CrO$_4$= (about 1:2) | 100 | 0 |
| Zn$^{++}$ | 50 | 1.1 |
| Cu$^{++}$ | 30 | 0.3 |
| Ni$^{++}$ | 40 | 0.5 |
| Al$^{+++}$ | 50 | 0.1 |
| Ca$^{++}$ | 60 | — |
| Cl$^-$ | 100 | — |
| CO$_3$= | 50 | — |
| PO$_4$≡ | 60 | — |
| CN$^-$ | 105 | 0.01 |
| Na$^+$ | 80 | — |
| K$^+$ | 30 | — |
| SO$_4$= | 100 | — |

As is seen from the foregoing results, excellent removals of hexavalent chromium and cyanide ions are obtained. When the ratios of CrO$_3$ to CrO$_4$= are varied over the range of 1:20 to 20:1 or when the hexavalent chromium containing contaminant is solely CrO$_4$= or Cr$_2$O$_7$= initially, equally good removals are obtainable in the presence of the cyanide ion, which is also removed to a similar extent. When the ratios of effluents are varied so that the proportion of chromate or other hexavalent chromium-containing ion(s) to cyanide ion is in the range of 1:100 to 100:1, preferably 1:50 to 50:1, 1:5 to 5:1, such good removals also result. The blends of hexavalent chromium and cyanide-containing effluents may be obtained from various commercial sources, including different plating solutions, cooling tower water purge streams, phosphatizing solutions, anodizing solutions and plating rinses.

The invention has been described with respect to illustrations and examples thereof but is not to be limited to them because it will be obvious to one of ordinary skill in the art, with the present specification before him, that equivalents and substitutes may be utilized without departing from the scope of the invention.

What is claimed is:

1. A method for electrochemically removing from an ionizing medium a contaminant ion which is capable of forming an insoluble iron compound or complex, which comprises passing an electric current through the ionizing medium containing the ion to be removed between an anode which has a surface or a portion of a surface thereof of iron, iron alloy or insoluble iron compound, and a cathode so as to produce anodically an insoluble iron compound, species or complex in said ionizing medium while cathodically reacting said contaminant ion with the ionizing medium to generate an insoluble hydroxide thereof and whereby an insoluble iron compound or complex with the contaminant ion is produced, and removing said insoluble iron compound or complex with the contaminant ion from the ionizing medium.

2. A method according to claim 1 wherein the ion removed is a toxic ion, harmful to animal life, the ionizing medium is aqueous, the contaminant is at a concentration of 0.03 to 50,000 parts per million before production of insoluble iron compound or complex, the electric current is direct or essentially direct, the current density is from 0.05 to 500 ASF, the electrolyte communicates freely with the anode and cathode without the interposition of a diaphragm, the anode surface is of iron or iron alloy and the pH of the aqueous medium is in a range in which the solubility of the insoluble iron compound or complex with the contaminant ion is less than 5 p.p.m. in the aqueous medium.

3. A method according to claim 2 wherein the electric charge supplied is from about 100 to 500% of the theoretical charge to convert the contaminant present to insoluble iron compound or complex form.

4. A method according to claim 2 wherein the aqueous medium containing contaminant is continuously passed through an electrolytic cell, the electrodes of which are covered by the medium, the dwell time of the contaminated aqueous medium in the cell is from 0.001 minute to one hour, and the electrical energy input to the cell is from 2 to 5 Faradays per equivalent weight of contaminant ion reacted.

5. A method according to claim 2 wherein the aqueous medium containing contaminant ion to be removed is continuously passed through an electrolytic cell, the dwell time of the contaminated aqueous medium in the treating cell is from 0.1 min. to one hour, after completion of treatment the treated medium is continuously removed from the cell, together with insoluble metal salt or complex of the contaminant ion and the pH of the effluent from the cell is regulated to be in the range of 4 to 11, at which pH essentially no soluble contaminant compound or complex is present, and the insoluble contaminant compound or complex is removed from the aqueous medium.

6. A method according to claim 1 wherein the ionizing medium containing contaminant is water containing hexavalent Cr in chromate or dichromate ion to be removed therefrom, the concentration of such ion in the aqueous medium charged to the cell is from 0.03 to 5,000 p.p.m. and the pH of the aqueous medium in the cell is in the range of about 4 to 11.

7. A method according to claim 6 wherein the pH is in the range of 6 to 10.

8. A method according to claim 6 wherein the aqueous chromate solution being treated is selected from the group consisting of chromate-containing purge streams from cooling tower water in which hexavalent chromate ion is present as a corrosion inhibitor, microbicide and slimicide; chrome plating rinse solutions; chrome phosphatizing solutions; and aluminum anodizing solutions; and the chromate is converted to and is removed as a trivalent chromium compound.

9. A method according to claim 4 wherein the ion to be removed is hexavalent chromate or dichromate, the ionizing medium is water, the concentration of said ion is from 1 to 5,000 p.p.m., as chromate ion, and the cathode has a surface or a portion of a surface thereof selected from the group consisting of metallic iron, steel and iron alloys.

10. A method according to claim 9 wherein the chromate or dichromate solution from which chromate contaminant is removed is continuously passed through an electrolytic cell, the dwell time of the chromate solution in the cell is from 0.1 minute to one hour and the pH of the solution is maintained in about the range of 6 to 10, at least in part by the electrochemical generation of hydroxyl ions in the electrolytic cell, and after completion of the electrolytic treatment and precipitation of insoluble iron compound or complexes of trivalent chromium therein, the treated medium is continuously removed from the cell, together with the insoluble trivalent chromium compound or complex.

11. A method according to claim 6 wherein the electric energy input is from 1 to 5 Faradays per equivalent weight of contaminant ion reacted.

12. A method according to claim 10 wherein the electric energy input is from 2 to 5 Faradays per equivalent weight of hexavalent chromium, as reduced to trivalent chromium.

13. A method according to claim 1 wherein the ionizing medium is aqueous and plural contaminant ions are present therein, including hexavalent chromium in chromate or dichromate ion, and cyanide.

14. A method according to claim 13 wherein the total contaminant concentration is from 0.03 to 50,000 p.p.m. before production of insoluble iron compounds or complexes, the electric current is direct or essentially direct, the current density is from 0.05 to 500 ASF, the electrolyte communicates freely with the anode and cathode without the interposition of a diaphragm, the anode surface is of iron or iron alloy and the pH of the aqueous medium is in the range in which the solubility of the insoluble iron compounds or complexes with the contaminant ions or products thereof is less than 5 p.p.m. in the aqueous medium.

15. A method according to claim 14 wherein the porportion of chromate or dichromate to cyanide is in the range of 1:50 to 50:1, the aqueous medium is continuously passed through an electrolytic cell, the dwell time of the medium in the treating cell is from 0.1 minute to one hour, after completion of treatment to treated medium is continuously removed from the cell, together with insoluble metal salts or complexes of the contaminants, and the pH of the effluent from the cell is in the range of 4 to 8, at which pH essentially no soluble contaminant compounds or complexes are present, and the insoluble contaminant compounds or complexes are removed from the aqueous medium.

16. A method according to claim 15 wherein the aqueous medium containing chromate or dichromate contaminant is mixed with an aqueous medium containing cyanide contaminant to produce a medium having a pH in the 4 to 7 range, which is then treated according to the method of claim 15 for the removal of hexavalent chromium and cyanide.

17. A method according to claim 1, wherein said ionizing medium is water, the reaction products include an insoluble iron oxide, or hydroxide and hydrogen.

18. A method according to claim 17, wherein the contaminant ion is hexavalent chromium which is reduced to trivalent chromium.

19. A method for electrochemically removing from an ionizing medium a contaminent ion which is capable of forming an insoluble iron compound or complex which comprises passing an electric current through an ionizing medium containing the ion to be removed between an anode which has a surface or a portion of a surface thereof of iron, iron alloy or insoluble iron compound and a cathode to form iron hydroxide in said ionizing medium, said iron hydroxide reducing the contaminant ion and forming an insoluble hydroxide of the reduced contaminant ion, said hydroxide of the reduced contaminant ion combining with said iron hydroxide to produce an insoluble iron compound or complex and removing said insoluble iron compound or complex from the ionizing medium.

20. A method according to claim 19, wherein the contaminant ion is hexavalent chromium which is reduced to trivalent chromium.

\* \* \* \* \*

UNITED STATES PATENT AND TRADEMARK OFFICE
CERTIFICATE OF CORRECTION

PATENT NO. : 3,926,754
DATED : December 16, 1975
INVENTOR(S) : Sung Ki Lee

It is certified that error appears in the above-identified patent and that said Letters Patent are hereby corrected as shown below:

Claim 15, Line 6, "treatment to" should be changed to --treatment the--.

Signed and Sealed this ninth Day of March 1976

[SEAL]

Attest:

RUTH C. MASON
*Attesting Officer*

C. MARSHALL DANN
*Commissioner of Patents and Trademarks*